(No Model.) 4 Sheets—Sheet 3.
W. E. WHARTON & F. T. FREEMAN.
ROBBER AND BURGLAR TRAP.
No. 594,818. Patented Nov. 30, 1897.
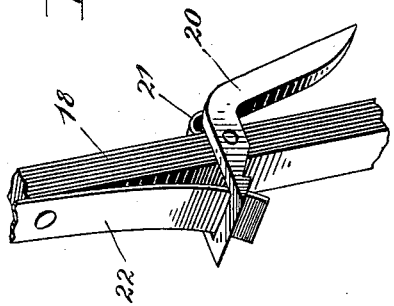
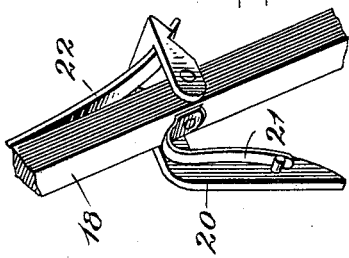
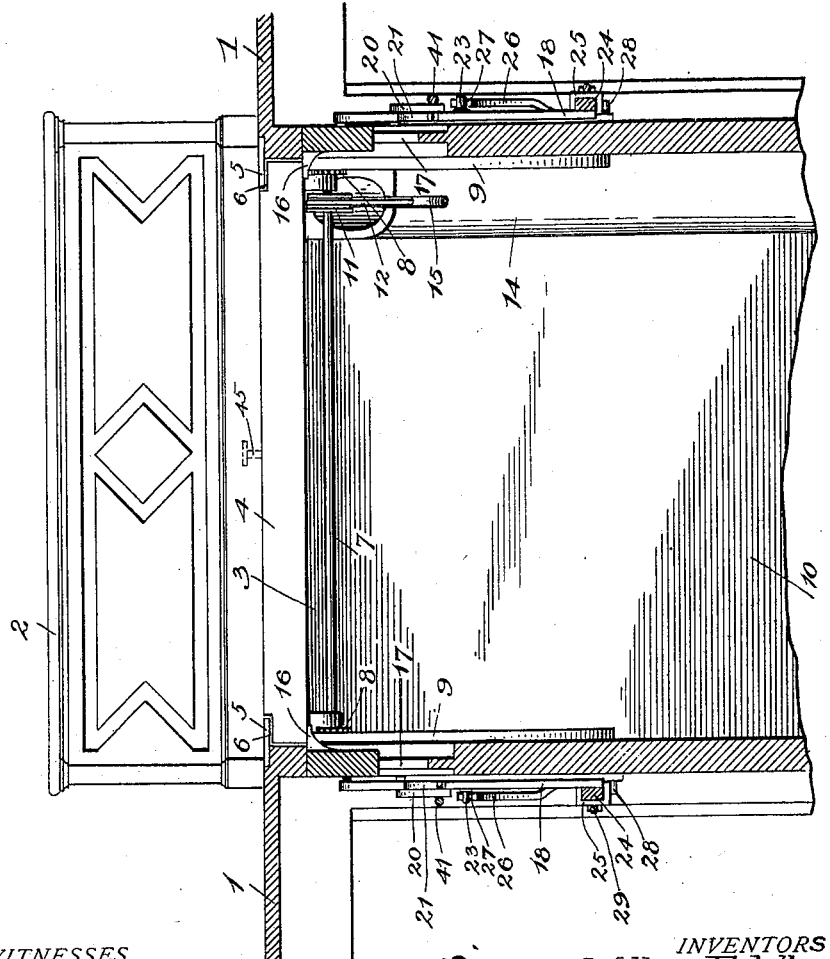
WITNESSES
INVENTORS
William E. Wharton.
Frank T. Freeman.
By John Hedderburn
Attorney

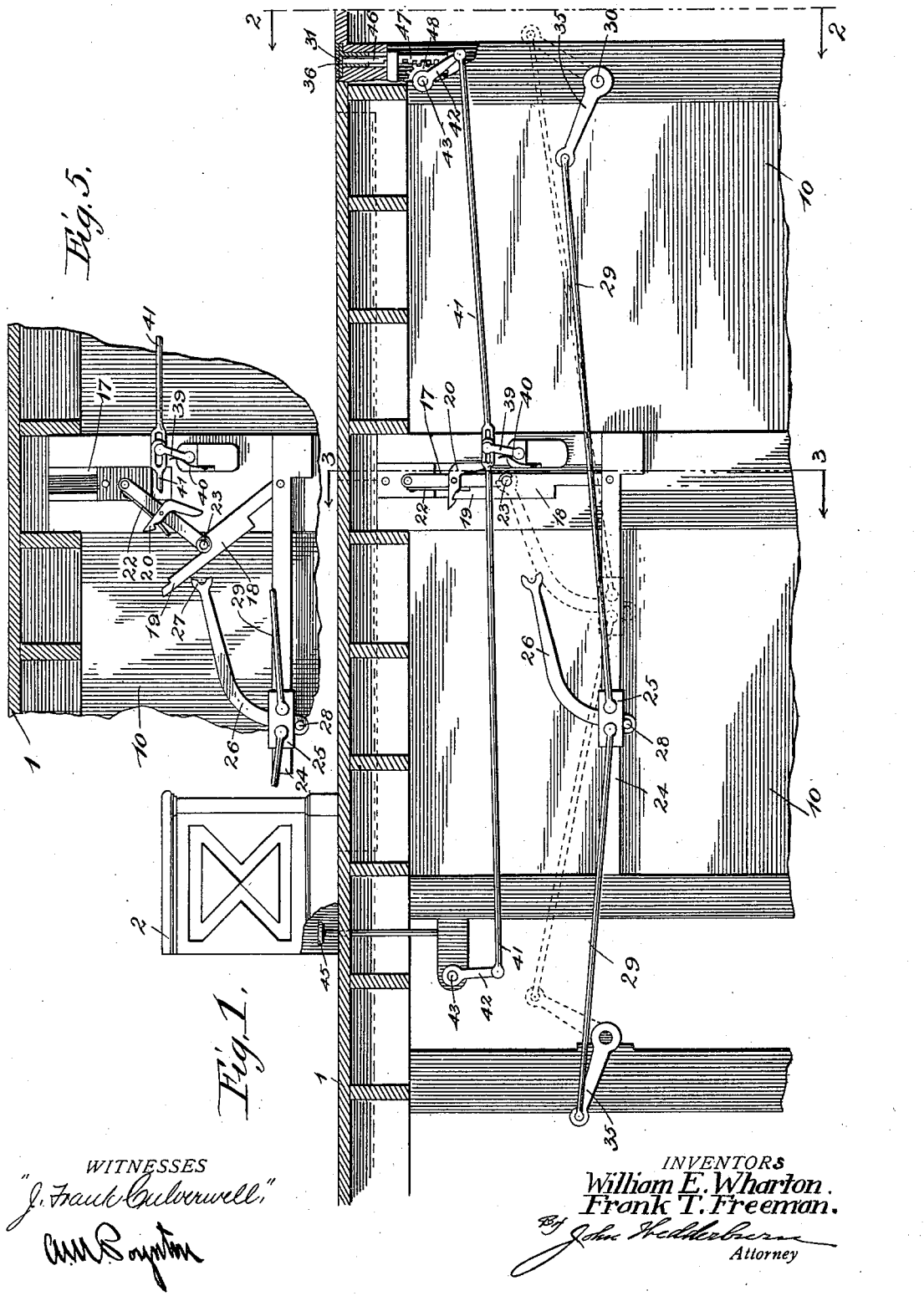

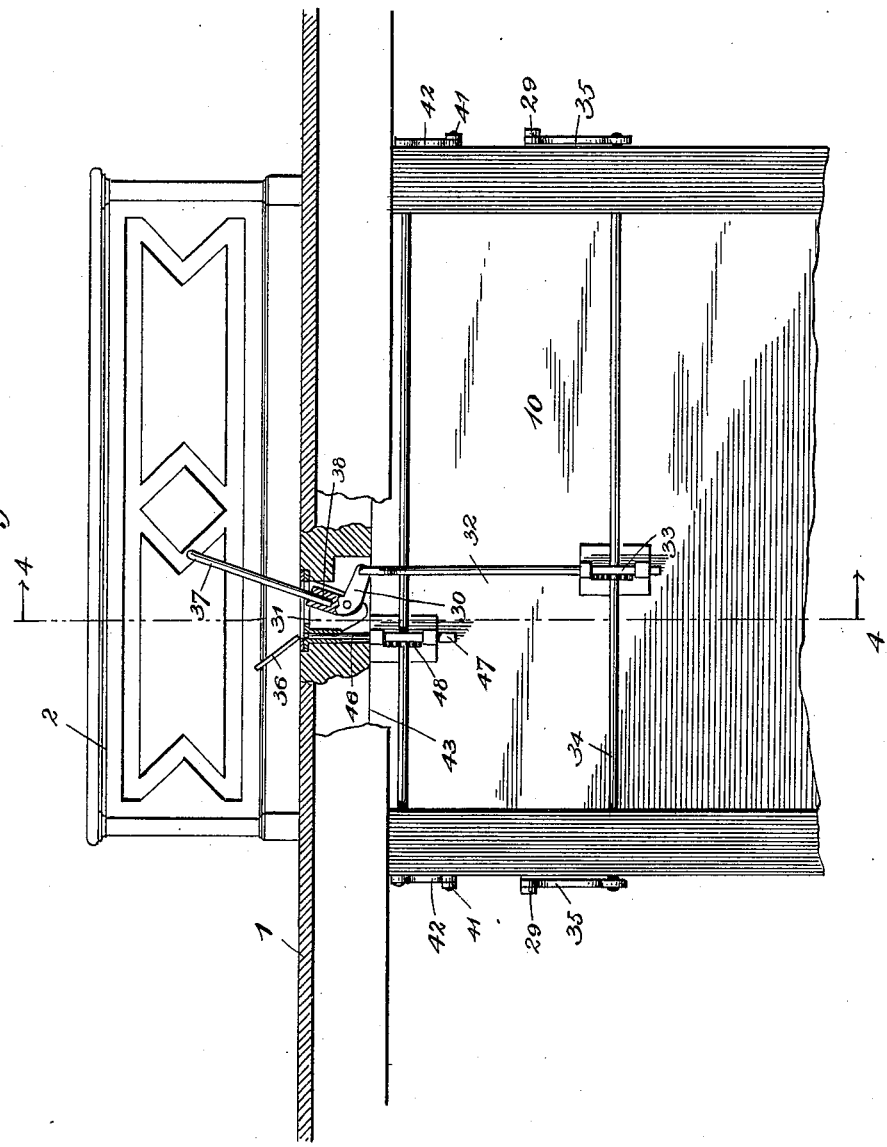

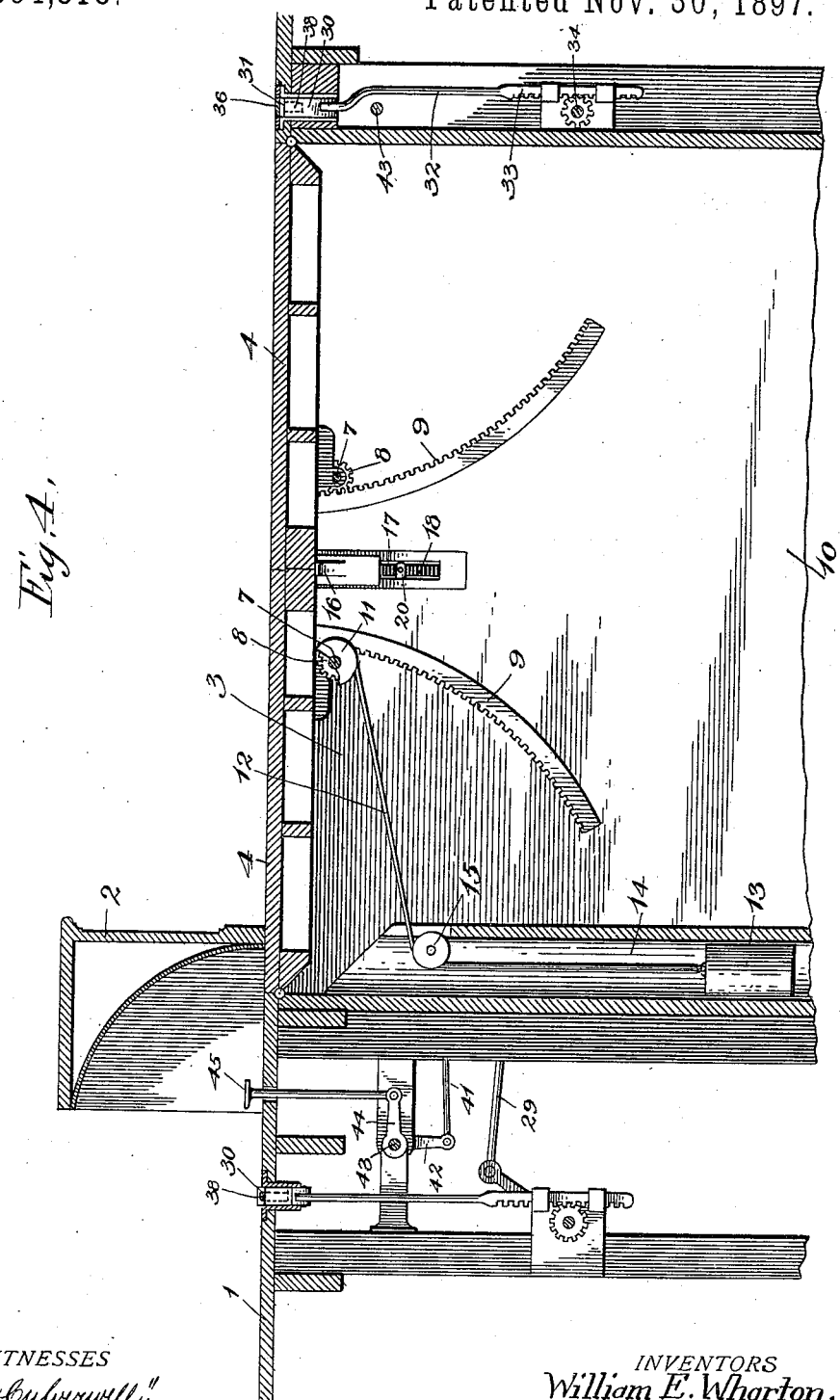

UNITED STATES PATENT OFFICE.

WILLIAM E. WHARTON AND FRANK T. FREEMAN, OF BENTONVILLE, ARKANSAS.

ROBBER AND BURGLAR TRAP.

SPECIFICATION forming part of Letters Patent No. 594,818, dated November 30, 1897.

Application filed March 1, 1897. Serial No. 625,504. (No model.)

*To all whom it may concern:*

Be it known that we, WILLIAM E. WHARTON and FRANK T. FREEMAN, citizens of the United States, residing at Bentonville, in the county of Benton and State of Arkansas, have invented certain new and useful Improvements in Devices for Entrapping Burglars, &c.; and we do hereby declare the following to be a full, clear, and exact description of the invention, such as will enable others skilled in the art to which it appertains to make and use the same.

This invention has reference to a device for capturing burglars and is adapted more especially for use in banks, and has for its object to provide a construction whereby a burglar can be dropped through a trap-door and thus captured.

The invention consists in the features of construction hereinafter fully described and claimed.

In the accompanying drawings, forming a part of this specification, Figure 1 is a vertical section through the floor of a bank and illustrating the devices for holding and releasing the pivoted traps of the floor. In this view certain parts are shown in dotted as well as full lines for the purpose of illustrating the operation of the different parts. Fig. 2 is a vertical transverse section taken on the line 2 2 of Fig. 1. Fig. 3 is a vertical transverse section taken on the line 3 3 of Fig. 1. Fig. 4 is a vertical section taken on the line 4 4 of Figs. 2 and 3. Fig. 5 is a view of the bracket-operating mechanism, showing the same in its sprung position. Fig. 6 is a front perspective view of the trigger. Fig. 7 is a rear perspective view of the trigger.

Referring now to said drawings, 1 indicates the floor of a bank or the like, and 2 the cashier's counter. Immediately in front of the counter 2 is an opening 3 in said floor, which is closed by two hinged doors or traps 4. These doors or traps 4 are hinged at their ends and at the ends of the opening, so that both the meeting ends of the traps move. The upward movement of the traps is limited by stops 5, projecting inwardly from the sides of the openings 3 to engage suitable stop-faces 6 upon the said traps. Each of said traps is provided on its lower side with a transverse rotatable shaft 7, carrying at each end thereof a gear-pinion 8, that intermeshes with the curved toothed racks 9, fastened to the walls 10 on each side of the pit below the traps. These curved toothed racks are concentric with the pivot of the traps in an obvious manner. Each of the shafts 7 is provided with a winding-drum 11, conveniently near one end thereof, and the belt or cable 12 is connected with said drum and with a weight 13, situated within the well or guide 14, conveniently at one corner of the pit. The cable 12 runs over a pulley 15 at the upper end of said well or guide. The said cable is further trained around the drum 11 of the shaft, so that the weight serves to turn the shaft in a direction to cause the pinions 8 to move upwardly upon the toothed racks and thus lift the traps or doors to the upward limit of their movement, or flush with the floor 1. The said weight, however, is not sufficient to hold the trap-doors against the weight of a person, since the device is arranged in a manner to cause the weight of a person to depress the inner ends of the doors against the action of this weight.

The doors are normally held flush with the floor by means of the sliding brackets 16, that are situated at the corners of the meeting edges of the doors. These brackets 16, project inwardly from the walls 10 and are movable in guides 17 upon said wall. When the brackets 16 are at the upper limit of their movement, they are in contact with the end faces or corners of the doors, and consequently serve to hold the doors flush with the floor. When the brackets, however, are at the lower limit of their movement, they are out of the path of the swinging edges of the doors. To hold these brackets fast and in engagement with the lower face of the doors and to allow the said brackets to move out of the path of the doors, we provide the toggle-lever 18, that is conveniently fastened on the outside of the wall 10, with its upper end pivoted to the bracket, while its lower end is pivoted upon said wall. The lower joint of the toggle-lever is provided with an extension 19, which when the joints of the toggle-lever are in alinement with each other lies flat against the face of the upper joint thereof. The upper section or joint of the toggle-lever is provided with a trigger 20, one end of which is situated to engage the upper end of the extension 19, while the other end extends downwardly and to one side of the toggle-lever. A spring 21 presses against said trigger and serves to hold the horizontal portion of the same in a position to engage the extension 19. The upper section or joint of the toggle-lever is also provided with a spring 22, that presses against the upper end of the extension when the latter lies upon the face of said toggle-lever. The joint of the toggle-lever is provided with a laterally-extending projection or pin 23, to be referred to hereinafter. Adjacent each toggle-lever and on the outer side of the wall 10 is a bar 24, upon which is mounted a slide 25, that carries a pivoted arm 26. The outer or free end of this arm is forked, as shown at 27. The said pivoted arm is controlled in its swinging movement by a stop-finger 28 on the pivot end thereof, that engages the face of the slide 25. The slide 25 is moved back and forth on the bar 24 by means of the rods 29, that are pivoted thereto and extend in opposite directions, so that the slide can be moved, for instance, from the front of the room or the front of the building or behind the counter.

The devices for moving the slide from a point near the door of the building—for instance, immediately below the door—consist of a pivoted lever 30, situated within a recess or opening 31 just below the door, and whose lower end is connected by means of the rods 32 with the toothed rack 33, that intermeshes with a shaft 34, extending across the ends of the pit and provided at its ends with the arms 35, to which the ends of the rods 29 are pivoted. It is seen, therefore, that when the lever 30 is turned on its pivot the slides are moved back and forth upon the bar 24 through the intermediacy of the parts just enumerated. The upper end of the lever 30 is of course situated below the floor and is conveniently covered by a pivoted trap 36, that is set flush with the face of the floor and which is covered when the door is closed. The lever is turned by means of the bar 37 and enters an opening 38 in said lever, which is inserted and removed as occasion requires. As shown in the drawings, another lever 30 is situated back of the counter 2, so that the parts can be operated from this end.

The parts normally stand in the position shown in full lines in Fig. 1—that is to say, with the brackets 16 in engagement with the lower face of the traps and holding said traps flush with the floor.

We will now proceed to describe the devices for tripping the trigger 20 to allow the brackets to descend and permit the traps to fall. Mounted upon the wall 10, adjacent the toggle-lever, is a tripping-lever 39, the upper end of which is situated to engage the lower end of the trigger. A spring 40 presses against this tripping device and serves to hold the upper end thereof normally away from the trigger. Connected with the tripping-lever 39 is a rod 41, that extends toward the counter and is pivoted at its rear end to the arm 42, carried by a shaft 43, extending transversely to the rod 41 and below the floor 1, in the rear of the counter. Just below the counter this shaft 43 is provided with an arm 44, that is connected with the foot-piece 45, extending upwardly and through the floor 1 in a position to be depressed by the foot of the cashier. It is seen that the spring 40 serves normally to hold the tripping-lever 39 away from the lower end of the trigger and consequently to move the parts connected with the tripping-lever and lift the foot-piece 45 above the floor. It is understood, of course, that the same arrangement of parts is on the other side of the pit and is controlled by the arm 42 of the shaft 43 in the manner just described. Devices are also provided for tripping the trigger from the front end of the room or at the door. In the recess 31 is an upwardly-extending pin 46, that carries at its lower end a toothed rack 47, and this rack intermeshes with a pinion 48 upon the shaft, that is provided at its ends with arms that are pivoted to rods whose ends are connected with the upper ends of the tripping-levers in the same manner described with relation to the rod 41, arms 42, and shaft 43 above referred to.

We will now proceed to describe the manner in which the device operates. For the purpose of explanation we will suppose that the bank is closed and that the toggle-lever is tripped or standing in the position shown in Fig. 5. In this position the brackets 16 are down, so that the traps are free to move. It is obvious that a thief breaking into a bank or other establishment having trap-doors constructed in this manner would fall into the pit upon treading upon these doors, and thus be entrapped, it being noted that the parts can be arranged to give a suitable alarm upon the swinging of the trap-doors. When the toggle-lever is thus tripped, the arms 26 stand in the position shown in full lines in said Fig. 1. When the doors of the bank are opened in the morning, it is necessary, of course, to raise the brackets to engage the ends of the trap-doors, and to accomplish this the person opening the door first raises the trap 36, and inserts the end of the bar 37 in the opening 38 of the lever 30. It is noted that when the pivoted arms 26 are in the position shown in full lines in Fig. 1 the lever 30 is at one limit of its movement, and therefore by moving the bar 37 to throw the lever 30 on its pivot the slide 25 is caused to move upon the bar 24, so that the forked end 27 of the arms 26 engage the pins or projections 23 of the toggle-levers, and the continued movement of the arm, it is obvious, moves the pivots of the toggle-levers, which throws the joints of the toggle-levers into alinement and consequently raises the sliding brackets, so that they stand against the lower face of the traps or doors to hold the latter in their horizontal position and flush with the floor. It is noted that when the joints of the toggle-levers stand in alinement the upper end of the trigger 20 engages the upper end of the extension 19 to hold the parts in this position. Then the bar 37 is thrown to the other limit of its movement to move the slide 25 to one side and to carry the arms 26 out of the path of the toggle-lever, as shown in full lines in said Fig. 1. The device is now set so that a person can walk upon the trap without danger of operating the same.

We will suppose, for instance, that an armed burglar enters the bank and, standing in front of the counter, threatens the cashier, and under the cover of a gun the cashier is not in a position to use his hands without danger of being shot. In this case it is only necessary for the cashier to press his foot upon the foot-piece 45 in the rear of the counter, which, it will be seen, through the intermediacy of the gearing and connections described draws the rods 41 toward the rear end and consequently forces the upper end of the tripping-levers 39 against the lower end of the trigger. This has the effect of lifting the upper end of the trigger from engagement with the end of the extension 19, so that the said extension is thrown to one side by the springs 22, whereupon the toggle-lever bends and allows the sliding brackets to fall, and the parts then assume the position shown in dotted lines in said Fig. 1. When the sliding brackets descend, it will be seen that they are moved out of the path of the swinging ends of the traps or doors and that therefore the weight upon the traps will cause the same to descend against the counterbalancing effect of the weight and allow the burglar to be dropped into the pit, where he can be easily captured, it being noted also that as soon as the traps are relieved of the weight of the burglar they rise at once to a horizontal position under the action of the counterbalancing-weights. If it is desired to keep the burglar within the trap, a bar can be inserted in the pivoted lever 30 in the rear of the counter to extend the toggle-lever and move the brackets upwardly and in engagement with the lower face of the sliding doors, as before described.

It is noted, of course, that ordinarily and during the day the parts are in the position above described—that is to say, with the traps located flush with the floor—and in leaving the bank in the evening the last person can just before closing the door insert a rod or bar and depress the pin 46, which has the effect of tripping the trigger and allowing the toggle-lever to move to the position shown in dotted lines in Fig. 1, so that the trap-doors are practically set and will fall to entrap a person walking upon the same. In this way the device can be used to entrap a person who enters the bank by stealth and when there are no occupants. It is further obvious that the tripping-levers 39 can be operated otherwise than by the foot-piece 45 or the pin 46. For instance, a finger-button or other device could be placed in a concealed position near the vault, so that if the cashier or the attendant is driven into the vault by a burglar who gains access to the rear of the counter without being noticed he could set the operative parts to allow the sliding brackets to fall, and in this way the burglar would be trapped as he attempted to leave the building.

Having thus described our invention, what we claim as new, and desire to secure by Letters Patent, is—

1. The combination with the pivoted traps and counterbalancing-weights, of a movable bracket for supporting the same, toggle-levers carrying said brackets, triggers for holding said toggle-levers extended, sliding arms for moving said toggle-levers to an extended position, and a tripping-lever for tripping said triggers.

2. In a device of the kind specified, the combination with the pivoted traps, of counterbalancing-weights, gearing between said counterbalancing-weights and said traps for raising the latter, stops to limit the upward movement of said traps, and movable brackets for supporting said traps, and devices for operating the same.

3. In a device of the kind specified, the pivoted traps, the counterbalancing-weights, rotatable shafts carried by said traps and having winding-drums connected by cables to said weights, gear-pinions upon said shafts intermeshing with stationary racks, stops to limit the upward movement of said traps, movable brackets for supporting said stops, and means for operating said brackets.

4. In a device of the kind specified, the pivoted traps having counterbalancing-weights, movable brackets for supporting the same, toggle-levers carrying said brackets, triggers and tripping devices for said toggle-levers, and movable arms situated to engage said toggle-levers and provided with devices for moving the same back and forth for the purpose of extending said toggle-levers.

5. In a device of the kind specified, the pivoted traps having counterbalancing-weights, movable brackets for supporting said traps, toggle-levers supporting said brackets and provided with triggers and tripping devices, a projection upon said toggle-levers at the joints thereof, a forked and pivoted arm carried by a slide and adapted to engage the projections of said toggle-levers, and devices for moving said slide back and forth.

6. In a device of the kind specified, the pivoted traps having counterbalancing-weights, the brackets, toggle-levers, triggers and tripping devices, slides carrying pivoted forked arms adapted to engage projections upon said toggle-levers, and a pivoted lever connected with said slides for moving the same back and forth.

7. In a device of the kind specified, the pivoted traps having counterbalancing-weights, sliding brackets movable in upright guides adjacent the corners of said traps, toggle-levers having the upper ends of their upper joints pivoted to said brackets, an extension upon one of the joints of said toggle-levers, a spring upon the other joint of said toggle-levers to engage said extension, a trigger carried by said other joint of the toggle-levers to engage the other end of said extension, tripping devices for said lever, and a movable arm situated to engage and move said toggle-levers to an extended position.

8. In a device of the kind specified, the pivoted traps having counterbalancing-weights, sliding brackets movable in upright guides and carried by toggle-levers, a trigger for holding said toggle-levers extended, tripping-levers situated adjacent to said triggers, a foot-piece connected with said tripping-levers for moving the same to trip said triggers, and movable arms situated to engage said toggle-levers for the purpose of extending the same.

9. In a device of the kind specified, the pivoted traps having counterbalancing-weights geared to rotatable shafts carried by said traps, racks upon a stationary part and geared to said rotatable shafts, stops for limiting the upward movement of said traps, sliding brackets movable in upright guides and situated to engage the sinking corners of the said traps, toggle-levers to the upper end of which said sliding brackets are pivoted, extensions upon one of the joints of said toggle-levers, springs upon the other joints of said toggle-levers to engage the said extension, pivoted spring-actuated triggers carried by the upper joint of said toggle-levers, to engage the said extensions, pivoted spring-actuated tripping-levers situated to engage said triggers, a foot-piece connected with said tripping-levers for operating the same, and pivoted and movable forked arms situated to engage projections upon said toggle-levers, and a pivoted lever connected with said arms for moving the same.

In testimony whereof we have signed this specification in the presence of two subscribing witnesses.

WILLIAM E. WHARTON.
FRANK T. FREEMAN.

Witnesses:
T. M. WYATT,
W. T. WATSON.